US009586167B2

(12) United States Patent
Schmid et al.

(10) Patent No.: US 9,586,167 B2
(45) Date of Patent: Mar. 7, 2017

(54) FLAT FILTER ELEMENT AND AIR FILTER

(71) Applicant: MANN+HUMMEL GMBH, Ludwigsburg (DE)

(72) Inventors: Daniel Schmid, Sachsenheim (DE); Eric Thebault, Ludwigsburg (DE); Guenter Goerg, Moeglingen (DE); Timo Dirnberger, Marbach (DE); Ralf Dietz, Remseck (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 0 days.

(21) Appl. No.: 14/493,486

(22) Filed: Sep. 23, 2014

(65) Prior Publication Data

US 2015/0007536 A1 Jan. 8, 2015

Related U.S. Application Data

(63) Continuation of application No. PCT/EP2013/056002, filed on Mar. 22, 2013.

(30) Foreign Application Priority Data

Mar. 23, 2012 (DE) .................. 10 2012 005 732

(51) Int. Cl.
*B01D 46/00* (2006.01)
*F02M 35/024* (2006.01)
(Continued)

(52) U.S. Cl.
CPC ..... *B01D 46/0005* (2013.01); *B01D 46/0006* (2013.01); *B01D 46/10* (2013.01);
(Continued)

(58) Field of Classification Search
CPC .. B01D 46/0006; B01D 46/521; B01D 46/10; B01D 29/21; B01D 46/2414;
(Continued)

(56) References Cited

U.S. PATENT DOCUMENTS 2,201,628 A * 5/1940 Russell et al. ................ 210/328
2,935,156 A * 5/1960 Scofield .......................... 96/224
(Continued)

FOREIGN PATENT DOCUMENTS

GB          1446195 A       8/1976

*Primary Examiner* — Amber R Orlando
*Assistant Examiner* — Britanny Precht
(74) *Attorney, Agent, or Firm* — James Hasselbeck

(57) ABSTRACT

A flat filter element to be mounted in a filter housing has an inflow surface and an outflow surface downstream of the inflow surface in a flow-through direction. A filter medium extend between the inflow surface and the outflow surface. A sealing section extends circumferentially relative to the flow-through direction. A seal fastened to or interacting with the sealing section is provided, wherein the seal, when the flat filter element is mounted in a filter housing, separates an inlet of the filter housing for air to be purified from an outlet of the filter housing for purified air. A first functional element section is arranged on at least one circumferential side of the filter medium so as to be spaced apart from the circumferentially extending sealing section. The first functional element section is attached to a lateral strip and the lateral strip is attached to the filter medium.

15 Claims, 11 Drawing Sheets

(51) Int. Cl.
  *B01D 46/10* (2006.01)
  *B01D 46/24* (2006.01)
  *F02M 35/10* (2006.01)

(52) U.S. Cl.
  CPC ... *B01D 46/2411* (2013.01); *F02M 35/02425* (2013.01); *F02M 35/02491* (2013.01); *B01D 2265/024* (2013.01); *B01D 2265/025* (2013.01); *B01D 2271/027* (2013.01); *B01D 2279/60* (2013.01); *F02M 35/10262* (2013.01)

(58) Field of Classification Search
  CPC  B01D 46/0004; B01D 46/008; B01D 46/525; B01D 46/0005; F02M 35/0203; F02M 35/024; F02M 35/02
  See application file for complete search history.

(56) References Cited

U.S. PATENT DOCUMENTS

| | | | | |
|---|---|---|---|---|
| 3,183,286 | A * | 5/1965 | Harms | 264/46.4 |
| 3,494,113 | A * | 2/1970 | Kinney | 55/481 |
| 3,770,127 | A * | 11/1973 | White | 210/136 |
| 4,051,033 | A * | 9/1977 | Blace | 210/193 |
| 4,440,555 | A * | 4/1984 | Chichester | 55/385.3 |
| 4,685,944 | A * | 8/1987 | Allan | B01D 46/0004 55/491 |
| 4,810,388 | A * | 3/1989 | Trasen | 210/638 |
| 4,853,005 | A * | 8/1989 | Jaisinghani | B03C 3/38 96/60 |
| 4,925,469 | A * | 5/1990 | Clement et al. | 55/480 |
| 5,213,596 | A * | 5/1993 | Kume et al. | 55/481 |
| 5,494,497 | A * | 2/1996 | Lee | 55/480 |
| 5,564,513 | A * | 10/1996 | Wible et al. | 180/68.3 |
| 5,569,311 | A * | 10/1996 | Oda et al. | 55/493 |
| 5,667,545 | A * | 9/1997 | Honda et al. | 55/497 |
| 6,190,432 | B1 * | 2/2001 | Gieseke et al. | 55/385.3 |
| 6,231,630 | B1 * | 5/2001 | Ernst et al. | 55/385.3 |
| 6,406,509 | B1 * | 6/2002 | Duffy | B01D 46/0001 156/212 |
| 6,513,481 | B2 * | 2/2003 | Stass et al. | 123/198 E |
| 6,521,122 | B1 * | 2/2003 | Elliot et al. | 210/163 |
| 7,004,986 | B2 * | 2/2006 | Kopec et al. | 55/337 |
| 7,682,416 | B2 * | 3/2010 | Engelland et al. | 55/481 |
| 8,034,145 | B2 * | 10/2011 | Boehrs et al. | 55/502 |
| 8,083,825 | B2 * | 12/2011 | Mosset et al. | 55/502 |
| 8,097,056 | B2 * | 1/2012 | Sasano et al. | 55/385.3 |
| 8,187,355 | B2 * | 5/2012 | Kim et al. | 55/502 |
| 8,292,983 | B2 * | 10/2012 | Reichter et al. | 55/497 |
| 8,496,723 | B2 * | 7/2013 | Reichter et al. | 55/503 |
| 8,808,417 | B2 | 8/2014 | Engelland et al. | |
| 2002/0020156 | A1 * | 2/2002 | Goerg | 55/385.3 |
| 2004/0020177 | A1 * | 2/2004 | Ota et al. | 55/481 |
| 2004/0074387 | A1 * | 4/2004 | Jaisinghani | B03C 3/09 95/63 |
| 2004/0129617 | A1 * | 7/2004 | Tanner et al. | 210/110 |
| 2005/0078552 | A1 * | 4/2005 | Zambaux | 366/241 |
| 2006/0137311 | A1 * | 6/2006 | Sundet | B01D 46/008 55/357 |
| 2006/0261002 | A1 | 11/2006 | Dworatzek et al. | |
| 2007/0095037 | A1 * | 5/2007 | McLamb, III | B01D 46/0023 55/495 |
| 2007/0269341 | A1 * | 11/2007 | Halverson et al. | 422/58 |
| 2008/0216455 | A1 | 9/2008 | Aizawa | |
| 2009/0289011 | A1 * | 11/2009 | Avakian | 210/668 |
| 2010/0018400 | A1 * | 1/2010 | Dirnberger | 96/422 |
| 2014/0250843 | A1 * | 9/2014 | Krull | B01D 46/0005 55/357 |

\* cited by examiner

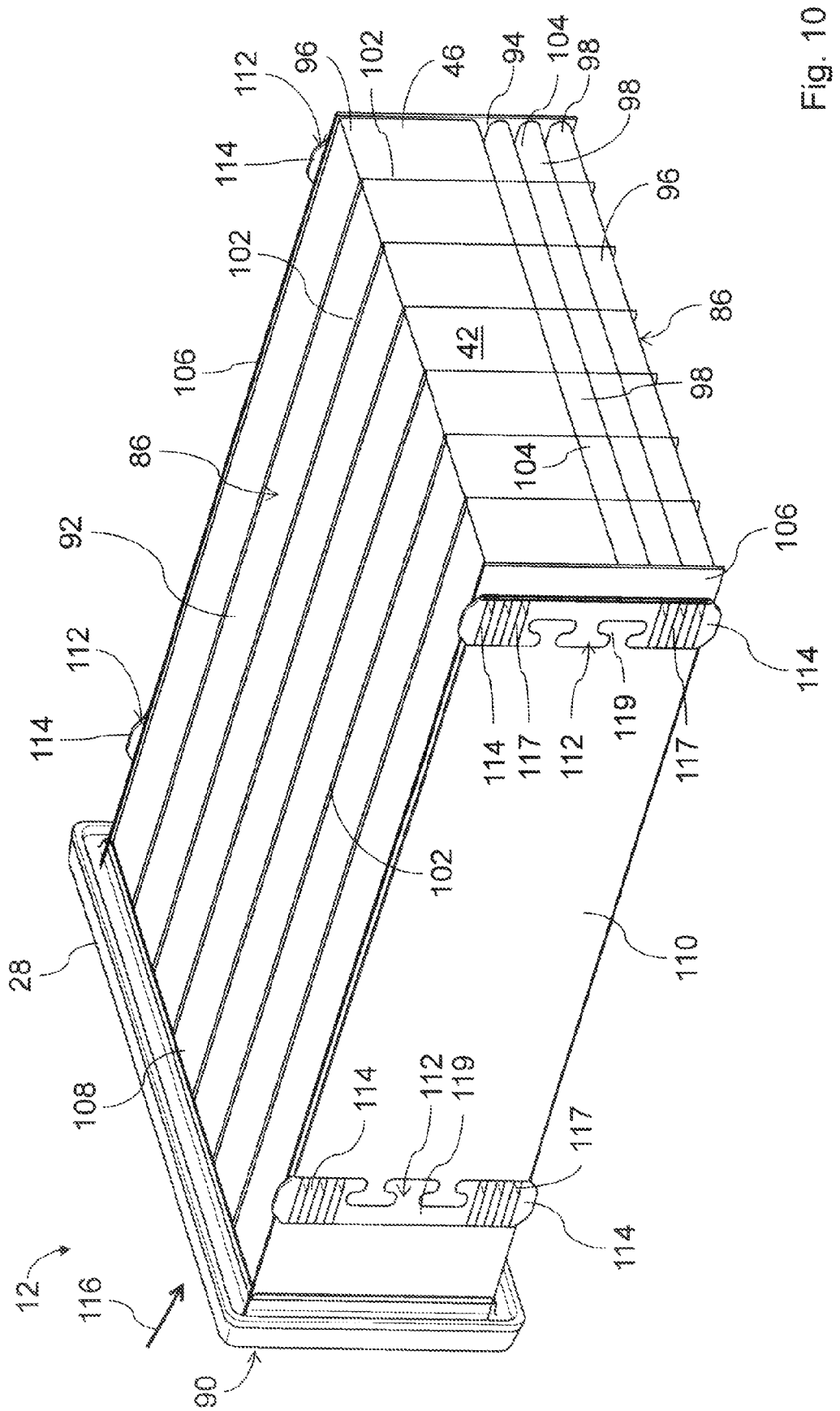

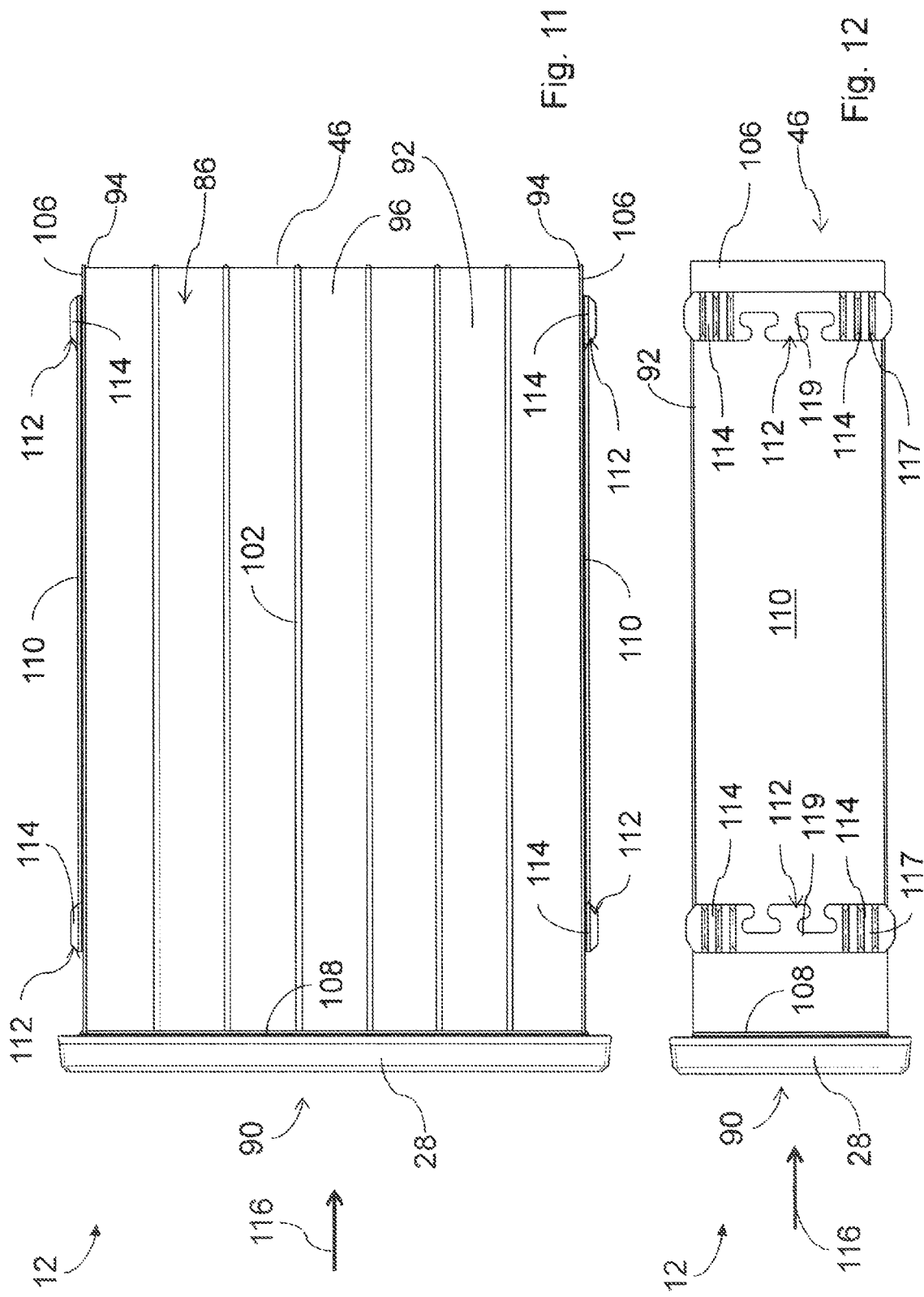

FLAT FILTER ELEMENT AND AIR FILTER

CROSS-REFERENCE TO RELATED APPLICATIONS

This application is a continuation application of international application No. PCT/EP2013/056002 having an international filing date of 22 Mar. 2013 and designating the United States, the International Application claiming a priority date of 23 Mar. 2012, based on prior filed German patent application No. 10 2012 005 732.6, the entire contents of the aforesaid international application and the aforesaid German patent application being incorporated herein by reference.

BACKGROUND OF THE INVENTION

The invention concerns a flat filter element, in particular of an air filter, in particular of an internal combustion engine, in particular of a motor vehicle, for mounting in a filter housing, comprising a filter medium and comprising a sealing section for a seal for sealing the flat filter element relative to the filter housing.

Moreover, the invention concerns an air filter with a filter housing, in particular a filter housing according to the invention, and such a flat filter element.

Flat filter elements for air filters are known on the market; they can be exchangeably inserted into a filter housing. Between an inflow side of the flat filter element which forms the raw air side, and an outflow side which forms the clean air side, the flat filter element comprises a sealing section for a seal for sealing the flat filter element relative to the filter housing. The seal is attached to the sealing section and is inserted together with the flat filter element into the filter housing. The flat filter element is arranged in such a way in the filter housing that it separates an inlet of the filter housing from an outlet for the air. The filter housing has a mounting opening through which the flat filter element can be inserted into the filter housing.

In a flat filter element in the meaning of the invention the filter medium is open, i.e., is not formed to a closed circumferential wall which surrounds an interior. In a folded filter medium this means that the end face folds as well as the end face edges are not connected to each other. Flat filter elements can be planar but can also have bends in various directions. In contrast to a flat filter element, in a round filter element the filter medium is closed, i.e., its end faces, in case of a folded filter element its end face folds, are connected to each other.

The invention has the object to design a flat filter element of the aforementioned kind comprising an attachment of at least one functional element section on the flat filter element that is advantageous with respect to manufacturing technology.

SUMMARY OF THE INVENTION

This object is solved according to the invention in that, spaced apart from the circumferential sealing section, on at least one circumferential side of the filter medium at least one functional element section is attached to a lateral strip that is attached to the filter medium.

According to the invention, at least one functional element section is thus provided which, for example, in addition to the seal, can support the flat filter element relative to an inner side of the filter housing. In this way, the flat filter element can be supported at least at two locations, i.e., at the location of the seal and at the location of the at least one support element section, and secured in the interior of the filter housing. The at least one support element section projects past the filter medium in at least one direction. It is arranged between the filter medium and the inner side of the filter housing in this way and holds the filter medium at a spacing to the filter housing. It is also possible to provide more than one support element section so that the filter medium can be supported at several locations relative to the inner side of the filter housing. In this way, positioning of the flat filter element in the filter housing can be further improved. The at least one support element section can be designed such that it can compensate component-related and/or mounting-related tolerances between the flat filter element and the filter housing.

In addition or as an alternative, the at least one functional element section can be embodied as a guide element section, i.e., can be designed such that it can guide the flat filter element upon insertion into the filter housing along a housing-associated guide path, in particular a guide groove or a guide rail. It can thus additionally act as a guide element. In addition or as an alternative, the support element section can be designed such that it can effect a damping action in particular of vibrations between the filter housing and the filter medium. In this way, the filter housing can be vibration-decoupled from the flat filter element. The mechanical load on the filter medium can thus be reduced. The susceptibility to failure can thus be reduced. In this way, also the service life of the flat filter element can be extended.

With the lateral strip a tolerance between the at least one support element section and the filter medium can be compensated in a simple way. With the lateral strip unevenness of the filter medium, in particular in case of a folded filter medium, can be simply compensated. The lateral strip can be advantageously flexible. The lateral strip can additionally act as a damping element between the filter medium and the at least one support element section. In this way, transmission of vibrations from the filter housing onto the filter medium can be further reduced. The lateral strip can be simply cut to length, in particular by cutting, in order to match it to the dimensions of the filter medium. The lateral strip can project past the side of the filter medium at least at one edge. It can be folded or bent easily at the at least one edge of the side of the filter medium. The lateral strip can be extended close to the sealing section for the seal and/or can be extended into it. It can overlap the sealing section and thus also the seal.

By use of the lateral strip for attachment of the carrier element the sealing function and the holding function can be separated from each other. The lateral strip can be optimized with respect to the sealing function for sealing the side of the filter medium. The at least one support element section can be optimized with respect to the holding function. The lateral strip can be optimized with respect to the sealing function. It can be realized with a thickness that, relative to its areal extension, is relatively minimal and can therefore be arranged in a space-saving way between the filter medium and the at least one support element section.

The seal can be arranged on the flat filter element. The seal can advantageously be connected by foaming of polyurethane foam to the sealing section. As an alternative, the seal can be pre-manufactured as a shaped part, in particular of rubber, and can be mounted on the sealing section, in particular pushed on or inserted. Alternatively, or additionally, a seal can also be mounted on the filter housing, preferably fastened. In this case, it is not required that the flat filter element itself is provided with its own seal.

Also, more than one support element section can be provided. At least two of the support element sections can be arranged on a common support element. Between the support element sections support gaps can be provided so that no continuous support on the inner side is realized. This differentiates the support action of the support element sections according to the invention from the support action of a seal which is continuous. In this way, the installation of the flat filter element can be simplified. As a whole, it is not required that the at least one support element section fulfills a sealing function. The at least one support element section can be optimized with regard to its effect for supporting and/or positioning and/or damping and/or holding. Advantageously, the at least one support element section can be made of plastic material. It can thus be manufactured easily. The at least one support element section can thus be provided with minimal weight. Also, complex shapes can be realized with plastic material. The flat filter element can advantageously be exchangeably arranged in the filter housing.

Advantageously, the filter medium can be folded in a zigzag shape. With a filter medium folded in a zigzag shape a great ratio between effective filter surface and required mounting space can be realized. In this context, the lateral strip can be preferably attached to a zigzag-shaped end face edge of the folded filter medium which forms a circumferential side of the filter medium. Additional lateral sealing measures are substantially obsolete when the lateral strip at least substantially completely covers the zigzag-shaped end face edge.

In an advantageous embodiment, at least two support element sections can be supported at least in opposite directions at corresponding support areas on inner sides of the filter housing. In this way, the filter medium can be supported in opposite directions and be held stably in this way. The filter medium can thus be clamped between the support areas of the filter housing. Advantageously, the at least two support element sections can project past opposite circumferential sides of the filter medium. The at least two support element sections can project also past the same circumferential side of the filter medium. The support direction can then extend parallel to the circumferential side wherein the support directions of the two support element sections can be oppositely oriented. In particular, the support element sections can be located on opposite sides of a single support element which can be arranged on the circumferential side of the filter medium. At least one of the support element sections can be realized also such that it can absorb, in addition to force components in opposite directions, also force components transverse to these directions.

Advantageously, between the at least two support element sections a support gap may exist. In the support gap no support of the flat filter element relative to the inner side of the filter housing is realized. In this way, the size of the support element sections can be reduced. Accordingly, the space requirement of the support element sections can be reduced. Moreover, the material demand for the support element sections can be reduced. Also, the freedom in shaping the filter housing, in particular the inner sides of the filter housing, and/or the support element sections can be increased. It is not required that the shapes of the inner side of the filter housing and the shapes of the support element sections are matched continuously relative to each other. The support element sections can thus be arranged in such a way on the circumferential side of the flat filter element that they can develop an optimal supporting action. Moreover, in case of support element sections that are separate from each other, an insertion process of the flat filter element into the filter housing can be simplified. A force expenditure upon insertion of the flat filter element can be reduced. Advantageously, at least one guide groove or guide rail can be arranged on the inner side of the filter housing with which the at least one support element section can be guided upon insertion of the flat filter element.

In a further advantageous embodiment, the at least one support element section can be attached to a carrier element and the carrier element can be attached to at least one side of the filter medium. Advantageously, the carrier element can be a carrier plate with which an areal connection to the filter medium is possible. In this way, the force transmission between the carrier plate and the filter medium can be improved. The carrier element and the at least one support element section can thus be pre-manufactured in a simple way. They can be connected as a common component to the filter medium. The carrier element and the at least one support element section can be realized as a modular component. The carrier element and the at least one support element section can be realized advantageously as a two component part. Advantageously, the carrier element can be made of a hard stable material. In this way, force transmission between the at least one support element section and the filter medium can be improved. Moreover, the filter medium can be reinforced with a stable carrier element. Deformations of the filter medium, in particular by vibrations, can thus be reduced. This has a beneficial effect, in particular for a folded filter medium, in regard to shape stability of the flat filter element.

Advantageously, at least two support element sections can be attached to a common carrier element. In this way, the carrier element can form a force connection between the at least two support element sections. In case that the two support elements are supported in opposite directions on the filter housing, a force action onto the filter medium as a result of the supporting action on the filter housing can thus be avoided. The carrier element can be fastened immediately on the filter medium. Alternatively, the carrier element can also be connected indirectly, in particular by means of a connecting element, preferably a lateral strip or a frame, to the filter medium. The carrier element can be connected with the filter medium by means of an adhesive connection, a weld connection or a mechanical connection, in particular a clip-on connection, a clamping connection, a snap-on connection, a plug-in connection or a screw connection. The carrier element can be designed such that it can additionally seal the side of the filter medium. The carrier element can also be free of any sealing function. In this way, the carrier element can be optimized with regard to its mechanical properties, in particular its carrying function and stabilizing function.

Advantageously, the carrier element can extend across the entire side of the filter medium. In the this way, the stability of the flat filter element can be improved. Alternatively, the carrier element may also cover only a part of the side of the filter medium. In this way, material and weight can be saved. The carrier element can advantageously be made of plastic material. It can thus be manufactured in a simple way and complexly shaped. By use of plastic material, the weight of the carrier element can be reduced. The carrier element can also have the shape of a frame which at least partially can frame the filter medium.

In a further advantageous embodiment, the carrier element can be attached by means of the lateral strip to the at least one side of the filter medium. Accordingly, the at least one support element section can be connected stably by means of the carrier element with the lateral strip.

Advantageously, the lateral strip can be a nonwoven. Preferably, the lateral strip can be made of a nonwoven. A nonwoven can combine a great tearing resistance with a high flexibility. A nonwoven can also be stretchable. A nonwoven moreover can be seal-tight for the fluid to be filtered by the flat filter element so that the side of the filter medium can be effectively sealed with it. A nonwoven can moreover be adjusted simply in regard to its shape, in particular cut, in order to match it to the dimensions of the side of the filter medium.

Advantageously, the at least one support element section relative to the filter medium can be elastically movable and/or deformable at least transverse to an insertion direction of the flat filter element into the filter housing. Due to the elasticity, the damping function can be improved. Moreover, a tolerance compensation between the flat filter element and the filter housing can be simply realized in this way. The at least one support element section upon insertion of the flat filter element into the filter housing can elastically yield so that the flat filter element can also pass constrictions and/or projections within the filter housing. In the correct mounting position of the flat filter element, the at least one support element section can support the flat filter element elastically with a mechanical tension relative to the inner side of the filter housing. The at least one support element section can be of an elastic material. Advantageously, the at least one support element section can be of a soft component, in particular a rubber-like plastic material. Alternatively or additionally, the at least one support element section can be connected by a connecting means indirectly, in particular by means of a carrier element and/or a lateral strip, or immediately elastically with the filter medium. The connecting means can be a spring element. However, the connecting means can also be elastically changeable and/or deformable in other ways.

In a further advantageous embodiment, the filter medium can be connected at one side with the seal for sealing the flat filter element relative to the filter housing and the at least one support element section can be arranged on a side of the filter medium which is facing away from the seal. In this way, the flat filter element can be supported and held in the correct mounting position within the filter housing at locations that are spaced apart from each other. In this way, a leverage action on the seal by the weight of the filter medium can be reduced. This is advantageous when the flat filter element is arranged horizontally in the operational position and is attached by means of the seal, viewed in horizontal direction, at one side on the filter housing. The flat filter element, viewed in horizontal direction, can then be additionally supported in the housing on the side opposite the seal. Advantageously, for the horizontal arrangement of the flat filter element, the at least one support element section can provide support spatially in downward direction relative to the filter housing.

In a preferred variant of the invention the carrier element for the functional element section is designed as a carrier plate which is resting areally on the lateral strip. When the carrier plate preferably covers only a partial section of the lateral strip, the required use of, for example, hard plastic material is reduced to the amount that is absolutely necessary.

Advantageous fastening variants provided by manufacturing technology result, for example, in that the lateral strip by means of an adhesive material is attached to the filter medium; the carrier element by means of an adhesive material on the lateral strip; and/or the at least one functional element section and the carrier element are produced by a two-component injection molding process as a two-component injection-molded part.

In particular when the functional element section serves as a support and/or guide element section, particularly beneficial leverage conditions result when the circumferentially extending sealing section is arranged in the area of the inflow or outflow surface wherein the at least one functional element section is arranged in the area of the other flow surface of the flat filter element.

The technical object is solved further by an air filter with a flat filter element as described above and in the following.

Preferably, on at least one inner side of the filter housing of the air filter at least one projection is arranged on which a support element section of the flat filter element is supported with mechanical tension in a mounting position of the flat filter element. In this sense, the filter housing is thus provided with a mechanical counter bearing in the form of a projection on which, in the correct mounting position of the flat filter element, the at least one support element section can be supported. The projection enables therefore an improvement of the supporting action. In this way, a damping action of the support element section can be further improved. Moreover, with the projection an improved point of attack for a force transmission onto the support element section can be realized. Advantageously, in an area of the filter housing in front of the at least one projection in the insertion direction of the flat filter element, a housing-associated guide means, in particular a guide groove or a guide rail, may be realized along which the at least one support or guide element section can be guided during insertion. Upon reaching the projection, a holding force between the projection and the support element section can be realized which contributes to holding, in particular clamping, of the flat filter element in the filter housing in the correct mounting position. The mechanical tension may be caused in this context by an elastic deformation and/or displacement of the at least one support element section. Advantageously, the mounting opening for the flat filter element can at least partially form an inlet opening for the air to be purified. Alternatively, the mounting opening can at least partially form an outlet opening for the purified air. A separate mounting opening is thus obsolete.

In an advantageous embodiment, at least two projections can be arranged on opposite sides of the interior between which two corresponding support element sections can be supported at least in opposite directions. Accordingly, the flat filter element can be clamped between the projections on opposite sides. The flat filter element can thus be held and supported by means of the support element sections and the oppositely positioned projections optimally between the inner sides in the interior of the filter housing. The flat filter element can thus be positioned and held on the two opposite sides at a spacing to the inner sides of the filter housing, respectively.

Advantageously, on at least one inner side of the filter housing at least one guide web can be arranged which can extend in the insertion direction of the flat filter element and whose top side that is facing the flat filter element can extend, in the insertion direction, first away from the corresponding inner side and, after a bend, in front of the at least one projection, can extend toward the inner side. Advantageously, the filter medium upon insertion can be resting on the guide web. Along the curved top side of the guide web the flat filter element can be moved on a curved path upon insertion into the filter housing. In this way, positioning of the at least one support element section on the corresponding projection can be simplified. The at least one guide web can be positioned advantageously spatially at the bottom for a horizontal insertion direction. In this way, the flat filter element can rest on the guide web upon insertion.

BRIEF DESCRIPTION OF THE DRAWINGS

Further advantages, features, and details of the invention result from the following description in which an embodiment of the invention will be explained in more detail with the aid of the drawing. A person of skill in the art will consider the features disclosed in combination in the drawing, the description, and the claims also individually and combine them to other meaningful further combinations.

FIG. 10 is an isometric illustration of the flat filter element of the air filter of FIGS. 1 to 9 without housing cover.

FIG. 11 is a plan view of the flat filter element of the air filter of FIGS. 1 to 10.

FIG. 12 is a longitudinal side view of the flat filter element of the air filter of FIGS. 1 to 11.

In the Figures, same components are identified with same reference characters.

DESCRIPTION OF PREFERRED EMBODIMENTS

Figure 1:
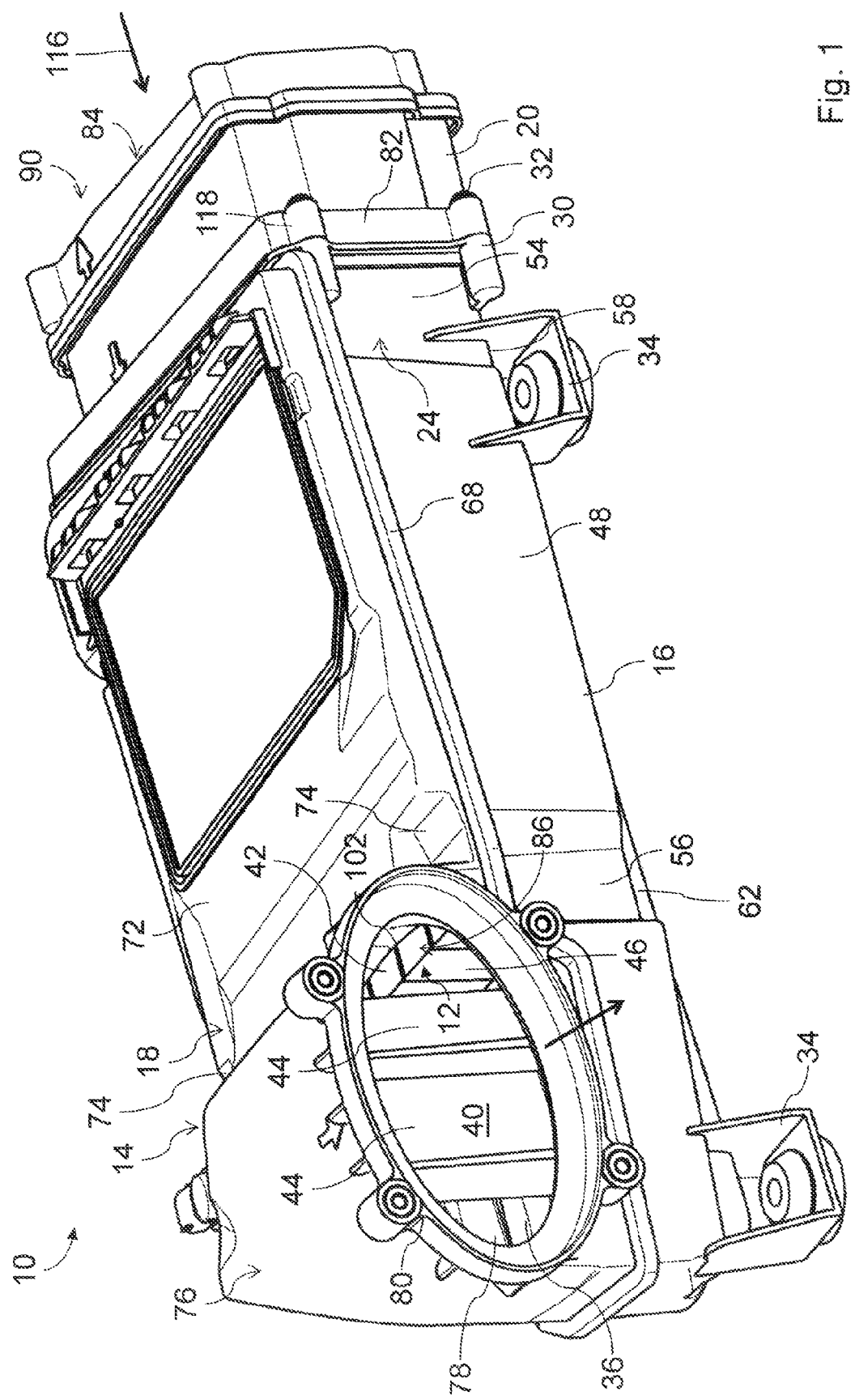
FIG. 1 shows an isometric illustration of an air filter of an internal combustion engine of a motor vehicle, comprising an air filter housing in which a flat filter element is arranged.
Figure 2:
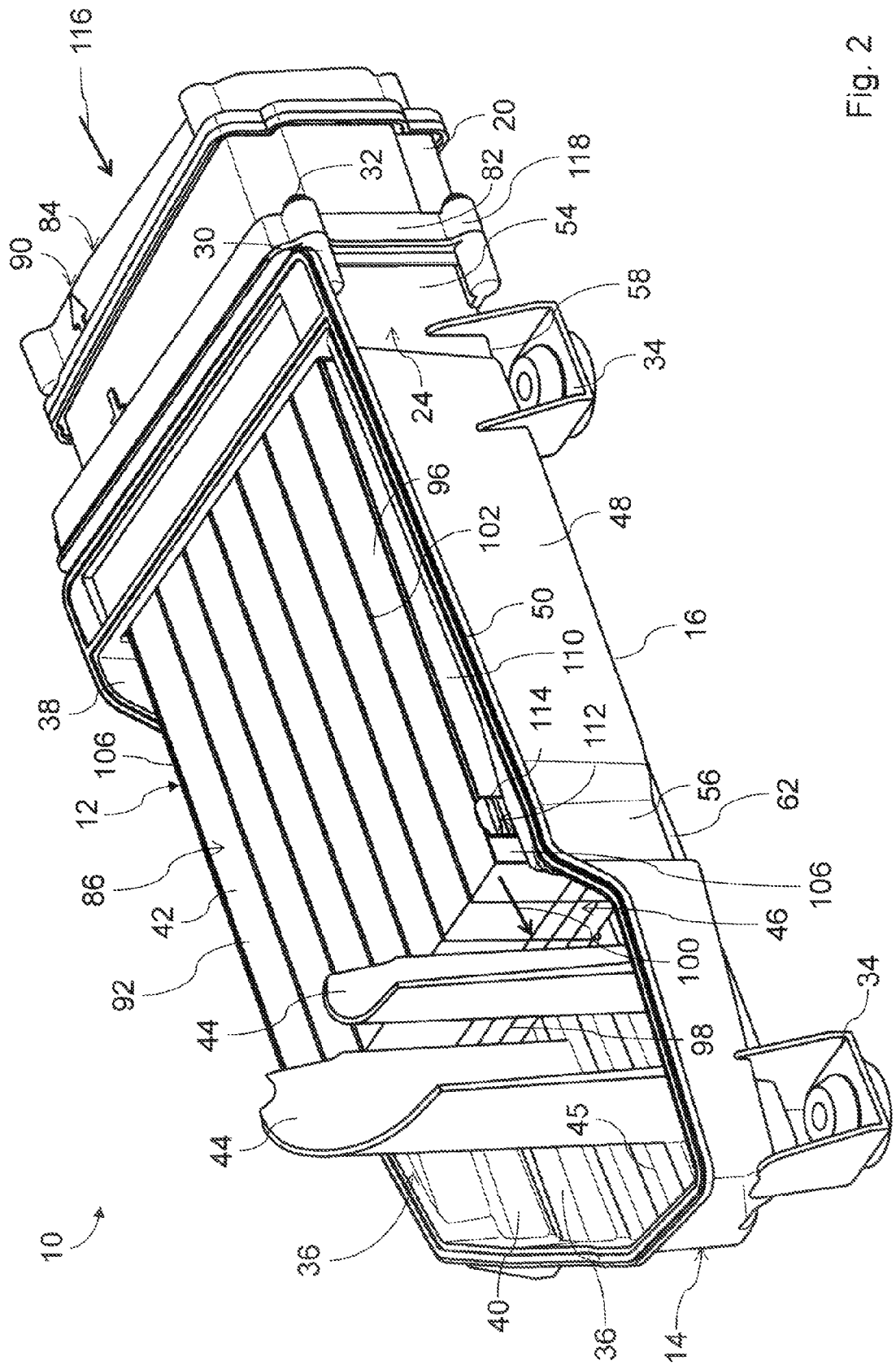
FIG. 2 shows the air filter of FIG. 1 wherein a housing top part of the air filter housing is removed.
Figure 3:
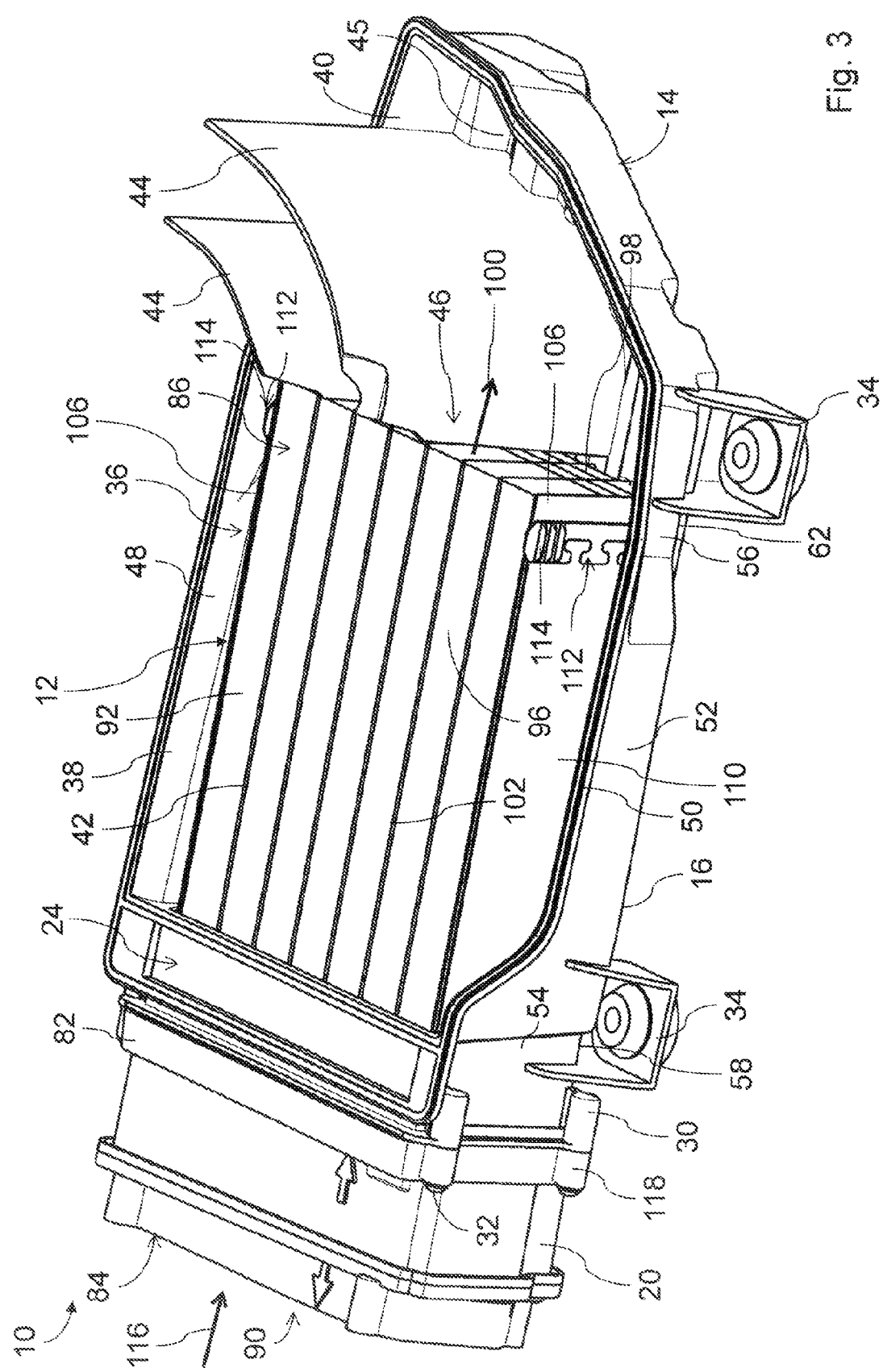
FIG. 3 shows the open air filter of FIG. 2 in another perspective view.

In FIGS. 1 to 8, an air filter 10 of an internal combustion engine, not shown otherwise, of a motor vehicle with an exchangeable flat filter element 12 is illustrated in various perspective views and section views. The flat filter element 12 is illustrated in FIGS. 9 to 12 in detail in various perspective views.

The air filter 10 is arranged in an intake manifold, not shown otherwise, of the internal combustion engine. It serves for purifying intake air. The air filter 10 comprises a filter housing 14 which is assembled of a housing bottom part 16 and a housing top part 18 as well as a housing cover 20. The housing bottom part 16, the housing top part 18, and the housing cover 20 are each made of a hard plastic material. In the normal mounted state of the air filter 10 illustrated in FIGS. 1 to 8, in which the flat filter element 12 is horizontally arranged, the housing bottom part 16 is arranged spatially at the bottom and the housing part 18 at the top. The designations "horizontal" and "vertical" relate to the filter 10 in its normal mounted state in space. Upon appropriate rotation and/or tilting of the filter 10, the orientations "horizontal" and "vertical" will change accordingly.

Figure 4:
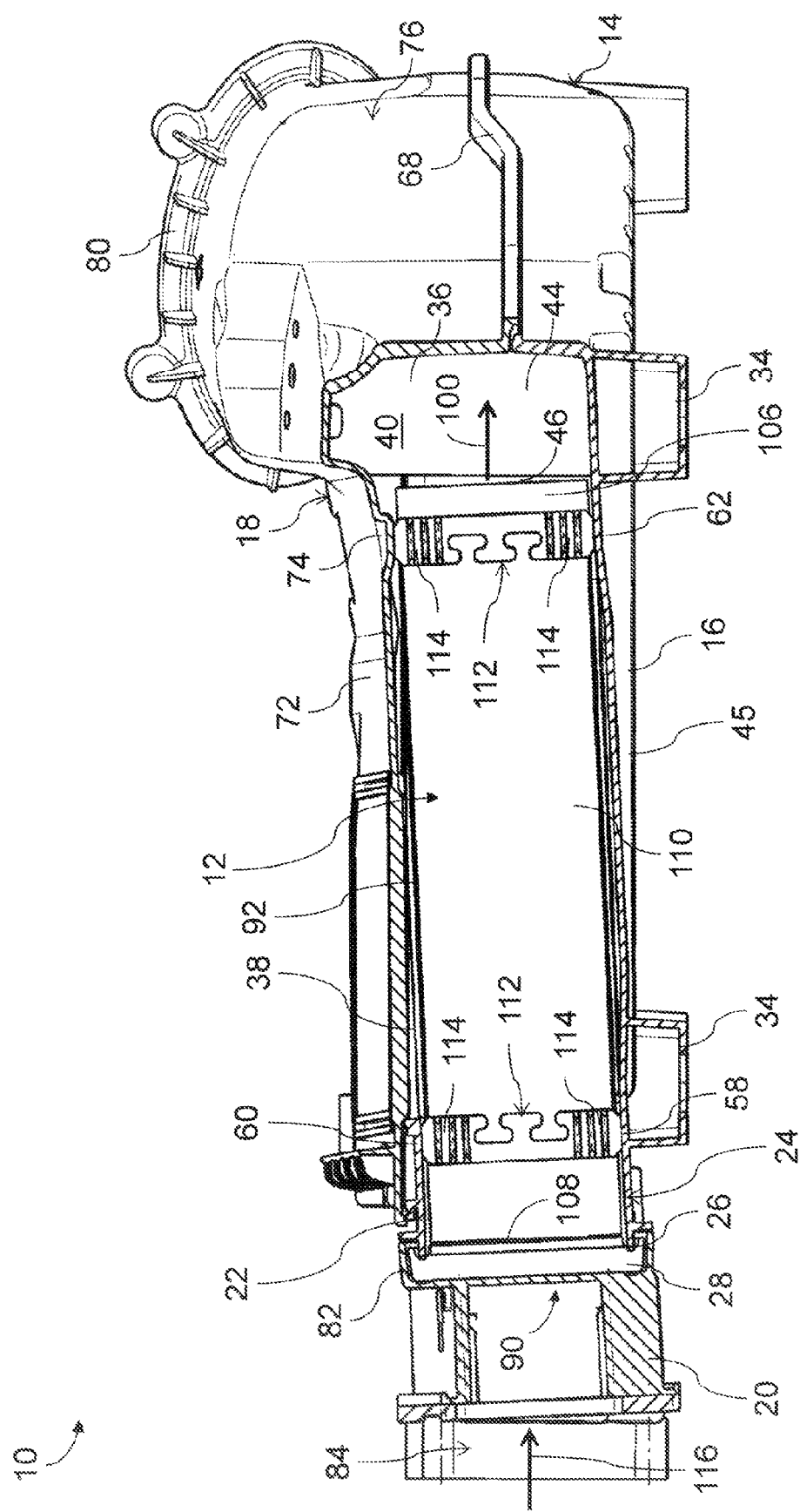
FIG. 4 is a vertical longitudinal section of the air filter of FIGS. 1 to 3.
Figure 5:
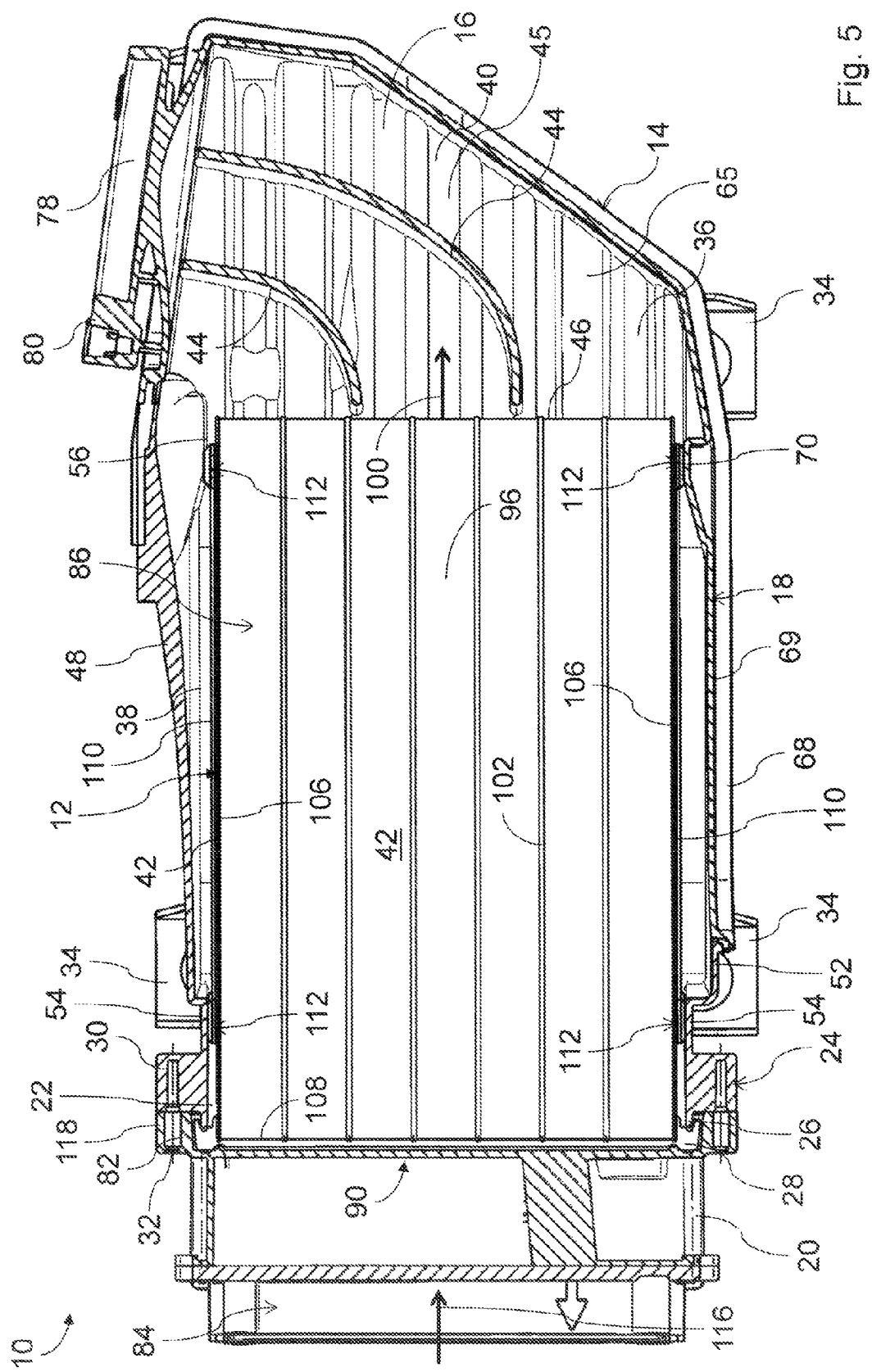
FIG. 5 is a horizontal longitudinal section of the air filter of FIGS. 1 to 4 through a section plane perpendicular to the section plane of the vertical longitudinal section of FIG. 4.
Figure 6:
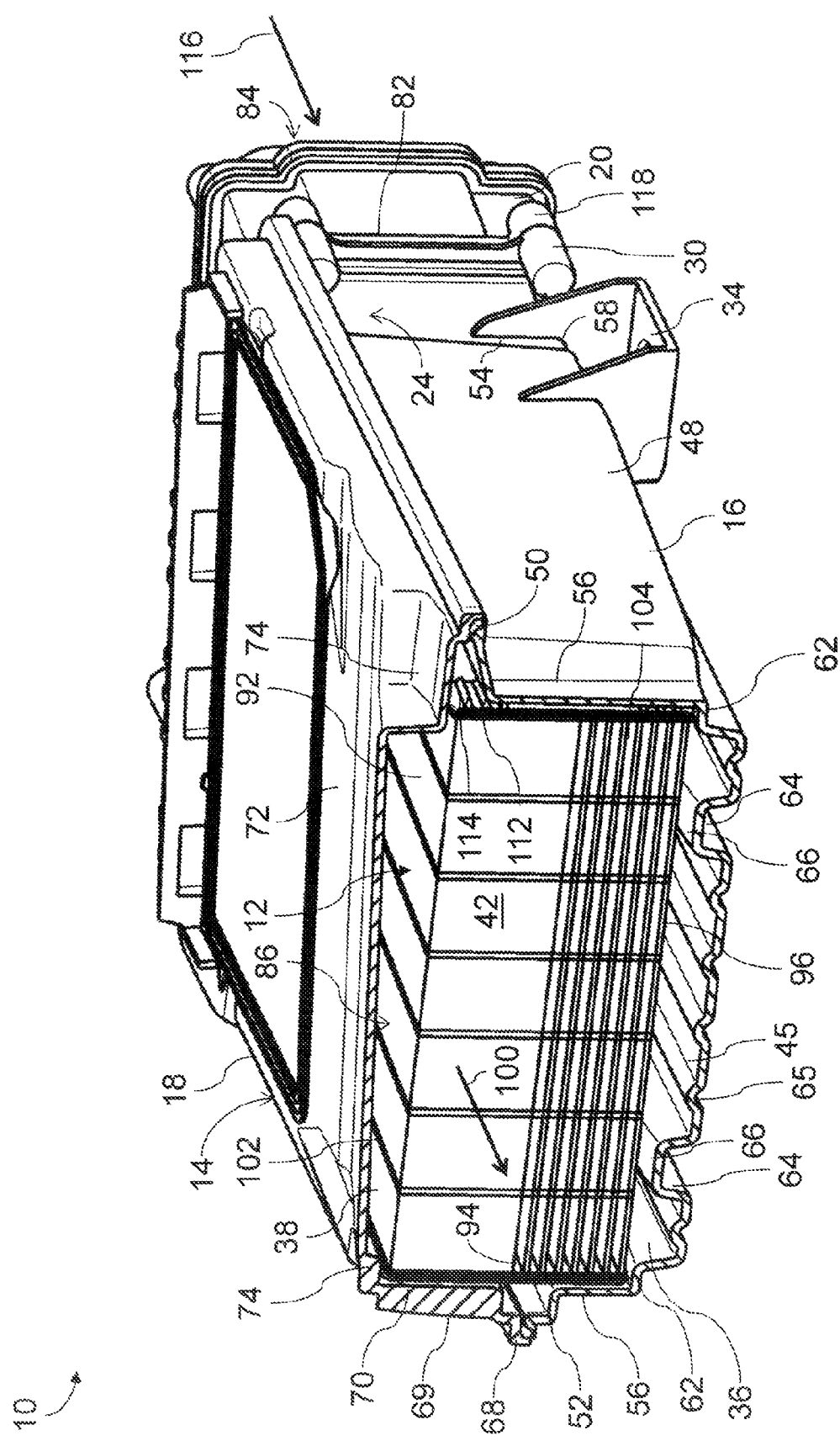
FIG. 6 is a first vertical cross-section of the air filter of FIGS. 1 to 5.

The housing bottom part 16 comprises an approximately parallelepipedal tub which is slanted at a closed end face and is provided with a mounting opening 22 at the opposite end face. The mounting opening 22 is illustrated in FIGS. 4 and 5. The mounting opening 22 is surrounded by a mounting frame 24 which is part of the housing bottom part 16. The mounting frame 24 is closed circumferentially. A free edge of the mounting frame 24 forms a sealing edge 26 on which, when the flat filter element 12 is installed, an approximately circumferentially closed rectangular seal 28 is resting. The seal 28 has an approximately U-shaped profile. The sealing edge 26 and the seal 28 are shown inter alia in FIGS. 4 and 5. The mounting opening 22 has an approximately rectangular cross-section.

A threaded bushing 30 is formed monolithically on the radial outer circumferential side of the mounting frame 24 at its corners, respectively. The threaded bushing 30 serves for receiving screws 32 with which the housing cover 20 can be connected detachably to the housing bottom part 16.

A total of four angled fastening members 34 are monolithically attached to the exterior of the housing bottom part 16 on the bottom side which is facing away from the housing top part 18. The angled fastening members 34 serve for attachment of the air filter 10, for example, on a frame of the internal combustion engine.

An interior 36 of the filter housing 14 is divided into an element space section 38 and a deflection space section 40. In the element space section 38 a filter medium 42 of the flat filter element 12 is arranged. The element space section 38 adjoins directly the mounting opening 22. In the deflection space section 40 there are two curved deflection walls 44 which are attached monolithically to a bottom 45 of the housing bottom part 16. The deflection walls 44 extend perpendicularly to the bottom 45 of the housing bottom part 16. The deflection walls 44 serve for deflecting an air stream from the outflow side of the filter medium 42, which forms its clean air side 46, by almost 90 degrees in the direction to a sidewall 48 of the housing bottom part 16.

A circumferential rim 50 on the free side of the housing bottom part 16 which is facing the housing top part 18 is bent in radial direction outwardly. At the side of the sidewall 48 in the area of the element space section 38, the rim 50 extends, when viewed from the mounting frame 24, at a slant toward the bottom 45 of the housing bottom part 16. In the area of the transition of the element space section 38 to the deflection space section 40, the rim 50 has a slanted step toward the bottom 45 of the housing bottom part 16. The height of the sidewall 48 thus decreases significantly here. The rim 50 extends approximately at the same height about the deflection space section 40 and along a sidewall 52 opposite the sidewall 48 to a location close to the mounting frame 24. In the area of the mounting frame 24, the rim 50 has a slanted step away from the bottom 45 and passes into an upper rim section of the mounting frame 24 which is facing away from the bottom 45.

In the area of the mounting frame 24 the sidewalls 48 and 52 are each recessed toward the element space section 38 so that here a front lateral projection 54 into the interior 36 is provided. The front lateral projections 54 each extend across the entire extension of the sidewalls 48 and 52 from the bottom 45 of the housing bottom part 16 to the rim 50. The rim 50 is not provided with such recesses. The front lateral projections 54 extend in the normal mounting position of the air filter 10 in vertical direction. The front lateral projections 54 are positioned opposite each other.

Within the element space section 38 in the area of the transition into the deflection space section 40, the sidewalls 48 and 52 are recessed toward the interior 36 to corresponding rear lateral projections 56. The two rear projections 56 are positioned also opposite each other.

The bottom 45 of the housing bottom part 16 in the area of the mounting frame 24 is recessed inwardly toward the interior 36 so that here a front lower projection 58 is provided. The front lower projection 58 passes at its ends into one of the front lateral projections 54, respectively.

The upper rim section of the mounting frame 24 which is facing away from the bottom 45 has a front upper projection 60 in the form of an inward recess. The front upper projection 60 is arranged opposite to the front lower projection 58.

In addition to the rear lateral projections 56, the bottom 45 of the housing bottom part 16 is recessed toward the interior 36 to a rear lower projection 62, respectively.

Moreover, at the bottom 45 of the housing bottom part 16 two guide webs 64 are integrally formed. The guide webs 64 project into the interior 36. They extend in the element space section 38 parallel to each other from the mounting frame 24 up to the deflection space section 40. The top sides 66 of the guide webs 64 which are facing the housing top part 18 are located at the same height. Viewed from the mounting frame 24 in an installation direction 116 of the flat filter element 12 into the filter housing 14, the top sides 66 rise first away from the bottom 45 toward the housing top part 18 in the normal mounted state of the air filter 10. In front of the rear lateral projections 56 and the rear lower projections 62, the top sides 66 descend, adjacent to a bend, toward the bottom 45. The guide webs 64 are illustrated in the FIGS. 6 and 7. The guide webs 64 serve as guide ramps for the flat filter element 12 upon insertion into the filter housing 14.

The bottom 45 of the housing bottom part 16 is provided with profiles 65 for stabilization which extend parallel to each other and parallel to the guide webs 64 through the interior 36 away from the mounting frame 24.

In the area of the element space section 38, the housing top part 18 has a lower height than the housing bottom part 16. At the side of the sidewall 48 the vertical extension of the housing bottom part 18 is significantly less compared to the sidewall 48. At the side of the sidewall 52, the vertical extension of the sidewall 69 of the housing top part 18 is approximately as large as the vertical extension of the sidewall 52.

A rim 68 of the housing top part 18 is resting circumferentially closed on the rim 50 of the housing bottom part 16. The rim 68 of the housing top part 18 is welded seal-tightly to the rim 50 of the housing bottom part 16.

Figure 7:
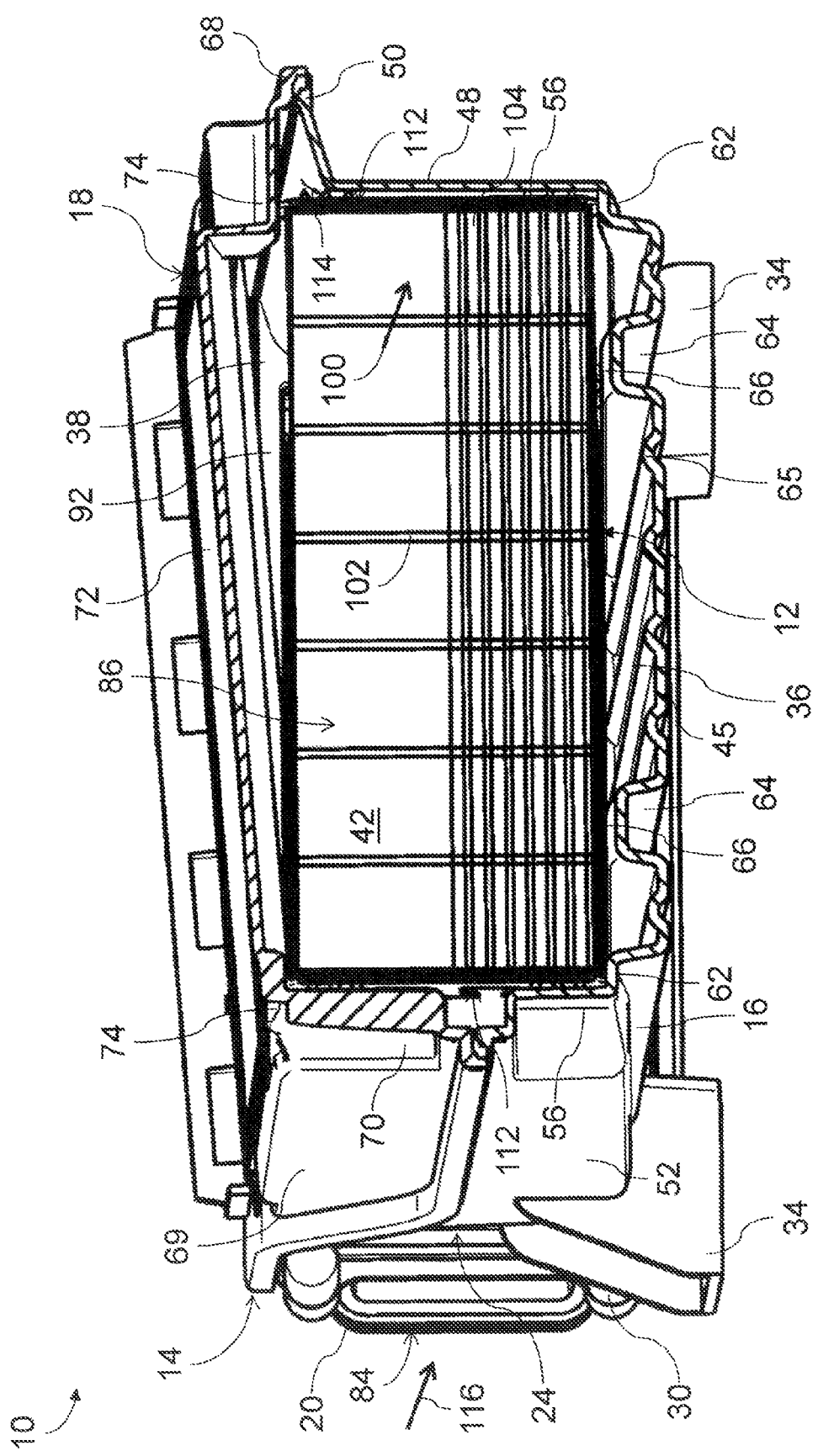
FIG. 7 is a second vertical cross-section of the air filter of FIGS. 1 through 6 in a section plane that is parallel to the section plane of the cross-section of FIG. 6.
Figure 8:
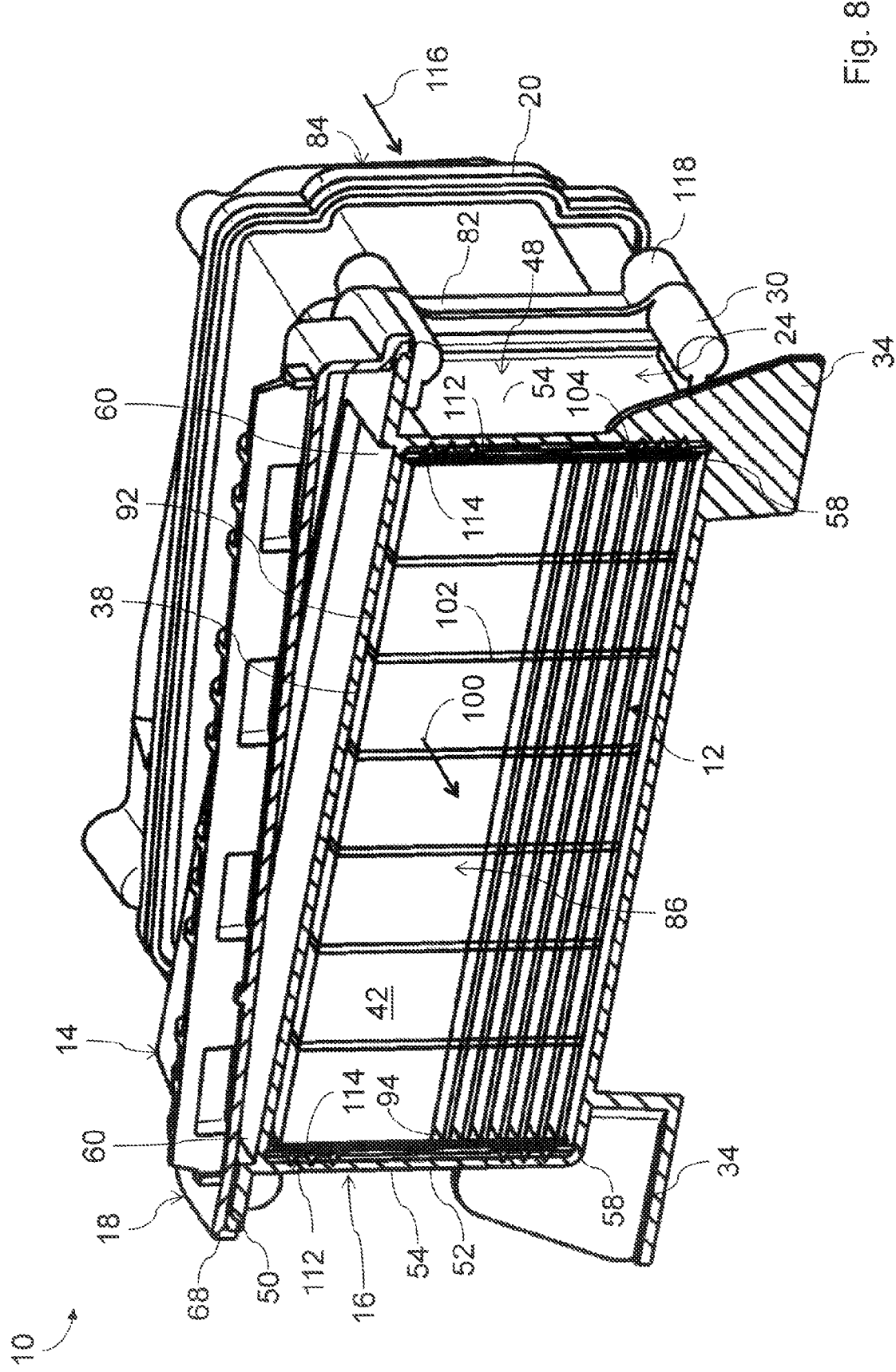
FIG. 8 is a third vertical cross-section of the air filter of FIGS. 1 to 7 in a section plane that is parallel to the section planes of the vertical cross-sections of FIGS. 6 and 7.

The sidewall 69 of the housing top part 18 comprises a rear lateral projection 70 into the interior 36, shown in FIG. 7, which, when the filter housing 14 is assembled, is aligned with the rear lateral projection 56 of the sidewall 52 of the housing bottom part 16.

A cover wall 72 of the housing top part 18 which is positioned opposite the bottom 45 of the housing bottom part 16 rises from the sidewall 69 toward the opposite side. The element space section 38 widens from the sidewalls 52 and 69 toward the sidewall 48 in vertical direction. At the end of the element space section 38 at the level of the rear lower projection 62 of the housing bottom part 16, the cover wall 72 is recessed toward the rear upper projections 74 into the interior 36. The rear upper projections 74 are located in the normal mounting position of the air filter 10, viewed in horizontal direction, on opposite sides adjacent to the rim 68. The rear upper projections 74 are positioned, viewed in vertical direction, opposite one of the rear lower projections 62 of the housing bottom part 16, respectively.

In the area of the deflection space section 40, the cover wall 72 passes into an outlet flange section 76. The outlet flange section 76 forms a dome-like expansion for the deflection space section 40. The deflection walls 44 extend up to the inner side of the outlet flange section 76 which is facing the bottom 45 of the housing bottom part 16. On its side which is facing the sidewall 48 of the housing bottom part 16, the outlet flange section 76 has a connecting flange 80 with an outlet opening 78 for purified air.

The housing cover 20 is a frame whose circumferential wall is stepped multiple times. The housing cover 20 is open at the side which is facing the mounting frame 24 and at the opposite side. The housing cover 20 partially forms an inlet 84 of the air filter 10 for air to be purified. The openings and the interior of the housing cover 20 and the mounting opening 22 form an inlet opening of the inlet 84. A sealing rim 82 of the housing cover 20 which is facing the mounting frame 24 fits the sealing edge 26 of the mounting frame 24. The sealing rim 82 of the housing cover 20 has at the radial inner circumferential side a step in outward direction in which the seal 28 is arranged when the air filter 10 is assembled. An inner cross-section of the housing cover 20 tapers from the sealing rim 82 to a free rim facing away from the sealing rim 82.

In the following, the flat filter element 12 will be explained with the aid of FIGS. 10 to 12. The flat filter element 12 comprises a filter bellows 86 of filter medium 42 folded in a zigzag shape. An imaginary envelope of the filter bellows 86 is approximately of parallelepipedal shape. The filter bellows 86 has an inflow surface or raw air side 90, in FIGS. 9 and 10 to the left and the rear and in FIGS. 11 and 12 to the left; an outflow surface or clean air side 46, in FIGS. 9 and 10 to the right and at the front and in FIGS. 11 and 12 to the right; two end faces 92, in FIGS. 9, 10, and 12 at the top and at the bottom; and two end face edges 94, in FIGS. 9 and 10 at the front to the left, respectively, at the rear to the right, and in FIG. 11 at the top and at the bottom. The filter bellows 86 is open at its end face folds 96 and end face edges 94, meaning that neither the end face folds 96 nor the end face edges 94 are connected to each other. The filter bellows 86 can therefore be referred to as "flat". The end face folds 96 are the two outer folds at the end faces 92 of the filter bellows 86. They extend parallel to the fold edges 98 along which the filter medium 42 is folded. The end face edges 94 have each the zigzag-shaped course of folds 104 of the filter bellows 86.

The flow-through direction 100 of the air to be filtered through the flat filter element 12 from the raw air side 90 to the clean air side 46 is indicated in FIGS. 2 to 8 by an arrow, respectively. The fold edges 98 extend perpendicularly to the flow-through direction 100. Moreover, the fold edges 98 are positioned perpendicular to the end face edges 94 and thus to the planes that are defined by the end face edges 94. The planes that are defined by the end face edges 94, respectively, extend parallel to each other and to the flow-through direction 100. They are perpendicular to the end faces 92. In the normal mounted state of the filter 10, the fold edges 98, the flow-through direction 100, and the end faces 92 extend horizontally; the planes that are defined by the end face edges 94 are extending vertical. The seal 28 is in a vertical orientation.

At the raw air side 90 the filter bellows 86 is framed in the rectangular seal 28 in a frame-like manner. The seal 28 projects past the filter bellows 86 at its end faces 92 and end face edges 94. The seal 28 is foamed of polyurethane foam onto the filter bellows 86 in a seal-tight manner. The opening of the U-shape profile of the seal 28 points toward the clean air side 46.

On the clean air side 46 of the filter medium 42, six support glue beads 102 extend perpendicular to the fold edges 98, respectively. The support glue beads 102 connect neighboring folds 104, respectively, and stabilize in this way the filter bellows 86.

A rectangular lateral strip 106 of nonwoven material is glued onto the end face edges 94, respectively. The lateral strips 106 are flexible. The lateral strips 106 close seal-tightly the sides of the filter bellows 86 at the end face edges 94. The lateral strips 106 project past the filter bellows 86 at the end faces 92 and at the fold edges 98. At the raw air side 90 the lateral strips 106 are enclosed by the seal 28. A section of the filter bellows 86 with the lateral strips 106 that is enclosed by the seal 28 forms a sealing section 108 of the flat filter element 12.

A rectangular carrier plate 110 with two elongate support elements 112 is glued, respectively, onto the exterior side of the lateral strips 106 that are facing away from the filter medium 42. The lateral strips 106 serves in this context as a flexible tolerance compensation between the carrier plates 110 and the filter bellows 86. The carrier plates 110 are made of a hard plastic material. The respective lateral strip 106 projects past the carrier plates 110 on all sides. The support elements 112 are located in the vicinity of the rim of the carrier plate 110 that is facing the raw air side 90 and of the rim that is facing the clean air side 46 on the exterior side that is facing away from the lateral strip 106, respectively. The support elements 112 are made of soft elastic plastic material. The carrier plates 110 are realized with the support elements 112 as two component parts.

The support elements 112 extend parallel to the planes that are defined by the end face edges 94 and perpendicular to an installation direction 116 of the flat filter element 12, vertical in the normal mounted state of the filter 12. The installation direction 116 extends in the present embodiment in the flow-through direction 100 of the flat filter element 12. The support elements 112 project past the carrier plates 110 in the direction of the fold edges 98 in outward direction, respectively. Moreover, the support element sections or guide element sections 114 of the support elements 112 project past the carrier plates 110 on both sides at the end faces 92 of the filter bellows 86, respectively. The support element sections 114 of the support element 112, viewed perpendicular to the installation direction 116, are positioned opposite each other. Also, each support element section 114 of one of the support elements 112 on an end face edge side is positioned opposite a support element section 114 of a support element 112 on the opposite end face edge side. Longitudinal axes of the support elements 112 on opposite end face edge sides are located on an imaginary plane perpendicular to the installation direction 116, respectively. Each support element section 114 has three support webs 117 which on the side opposite the filter element 42 project outwardly in the direction of the fold edges 98. The areas of the support elements 112 between the support webs 117 of the two support element sections 114 act as support gaps 119 where no support relative to the filter housing 14 is realized when the filter element 12 is installed.

Viewed in the installation direction 116, a spacing between the support element sections 114, respectively, the support elements 112 on the same end face edge side of the filter bellows 86 corresponds to a spacing between the front lateral projections 54 and the rear lateral projections 56 and 70, the front lower projection 58 and the rear lower projections 62, and the front upper projection 60 and the rear upper projections 74. In the correct final mounting position of the flat filter element 12 in the filter housing 14, one of the support element sections 114 is supported on each one of the projections 54, 56, 58, 60, 62, 70, and 74.

Figure 9:
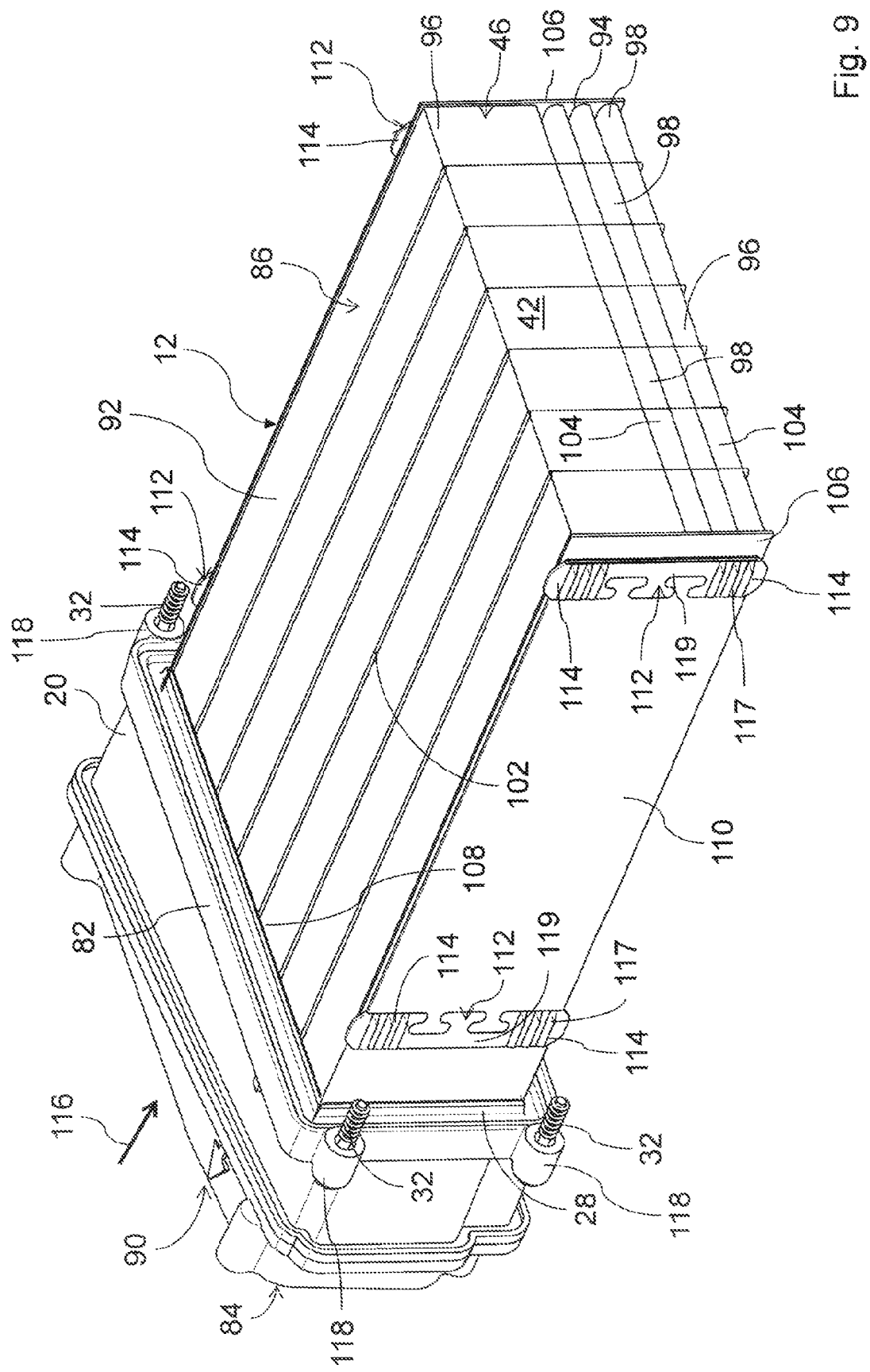
FIG. 9 is an isometric illustration of the flat filter element with a housing cover of the air filter housing of the air filter of FIGS. 1 to 8.

For installation of the flat filter element 12 in the filter housing 14, the filter bellows 86, with the mounted seal 28 leading, is inserted into the sealing rim 82 of the housing cover 20. The flat filter element 12 with the mounted housing cover 20 is shown in FIG. 9. Subsequently, the flat filter element 12, with the clean air side 46 leading, is inserted in the installation direction 116 through the mounting opening 22 of the mounting frame 24 of the housing bottom part 16 into the interior 36. The lower end face 92 of the filter bellows 86 which is facing the housing bottom part 16 is positioned in this context on the top sides 66 of the guide webs 64 and is first tilted upwardly and then tilted downwardly in the element space section 38 along a curved path upon further insertion. In this context, the guide webs 64 assist in positioning the clean air side-associated support element sections 114 on the respective rear projection 56, 62, 70, and 74.

Upon insertion of the flat filter element 12, the elastic support element sections 114 yields and adjusts to the contours of the inner sides of the filter housing 14. In the correct mounting position of the flat filter element 12, which is shown in FIGS. 1 to 8, the support element sections 114 are resting on the appropriate projections 56, 58, 60, 62, 70, and 74 with elastic mechanical tension. In this context, oppositely positioned support element sections 114 of the raw air side-associated support elements 112 are clamped between the front upper projection 60 and the front lower projection 58. Oppositely positioned support element sections 114 of the clean air side-associated support elements 112 are clamped between the respective rear lower projection 62 and the corresponding rear upper projection 74. The forces that are produced between the support element sections 114 are transmitted by the stiff carrier plates 110. Also, the two front support elements 112, in particular the support webs 117, are clamped between the two front lateral projections 54. The two rear support elements 112, in particular the support webs 117, are clamped between the two rear lateral projections 56 and 70, respectively.

In the correct mounting position, the sealing rim 82 of the housing cover 20 is resting seal-tightly on the sealing rim 26 of the mounting frame 24 with interposition of the seal 28.

For fixation of the flat filter element 12, the screws 32 are inserted through corresponding bushings 118 of the housing cover 20 and screwed into the threaded bushings 30 of the mounting frame 24.

Upon installation of the flat filter element 12 into the filter housing 14, a tolerance compensation is achieved with the elastic support element sections 114. Upon operation of the air filter 10, the elastic support element sections 114 act furthermore as damping elements and protect in this way the filter bellows 86 from vibrations. By clamping of the support element sections 114 between the respective opposite projections 54, 56, 58, 60, 62, 70, and 74, the flat filter element 12 is secured in the element space section 38 of the interior 36. With the clean air side-associated lower support element sections 114 the flat filter element 12 is supported on the rear lower projections 62. In this way, mechanical loading of the seal 28 by a leverage action as a result of the weight of the filter bellows 86 is prevented.

In the described embodiments, the support elements 112 and the support element sections 114 have no sealing function. A support action of the flat filter element 12 on the inner side of the filter housing 14 is achieved by means of the support element sections 114 at locations that are separate from each other.

The following modifications are possible inter alia in the afore described embodiment of an air filter 10, of a flat filter element 12, and of a filter housing 14.

The invention is also not limited to flat filter elements of air filters of internal combustion engines. It can also be employed for different kinds of flat filter elements for fluids of internal combustion engines, for example, oil, fuel or water. Also, it can be employed outside of the field of internal combustion engines, for example, in building technology or water treatment. It can also be employed outside of automotive technology in other kinds of internal combustion engines, for example, in industrial motors.

The air filter 10 can also be arranged in a different way in space wherein the orientation of the components relative to each other does not change.

The filter housing 14 can also be comprised of more or fewer than three housing parts. The housing bottom part 16 and the housing top part 18 can also be realized as a monolithic housing part.

Folding of the filter bellows 86 can also be designed differently. Instead of extending horizontally, the fold edges 98 can also be extending vertically or at a slant.

Instead of the filter medium 42 folded in a zigzag shape, a different kind of filter medium can be provided also. For example, a solid parallelepipedal filter medium, for example, a foam-like block can be used also. Instead of the rectangular filter bellows 86, a filter bellows may be used also whose sides extend at a slant relative to each other. It is also possible to provide a filter bellows in which at least one of the sides is not planar but has at least one bend.

Instead of the seal 28 of polyurethane foam, a different kind of seal, for example, a shaped seal, for example of rubber, can be also connected seal-tightly to the folded filter bellows 86.

The seal 28, instead of being connected fixedly to the filter bellows 86, can also be detachably pushed onto it. The seal 28 can also be arranged on the housing. It can be, for example, connected fixedly to the filter housing 14. It can also be fixedly connected to the housing cover 20 or to the housing bottom part 16.

The seal 28 can also have a different profile instead of the U-shape profile.

The rim 68 of the housing part 18, instead of being connected by means of welding, can also be connected by means of a different type of connection, for example, an adhesive connection, a snap-on connection, a clamping connection or another type of screw connection, seal-tightly to the rim 50 of the housing bottom part 16.

It is also possible to have fewer or more than two support elements 112 on an end face edge side of the filter bellows 86.

Instead of the elastic deformable support elements 112 also different kinds, for example, also rigid, support elements 112 and support element sections 114 can be provided which, for example, by means of an elastic connection with the filter bellows 86, can be moved elastically relative to the latter.

The support element sections 114 can also be designed such that they project only past the end face edge sides or only past the end faces 92 of the filter bellows 86. Also, support element sections 114 can be provided which project past the filter bellows 86 at the fold edges 98.

The support elements 112 and the carrier plate 110, instead of being provided as a two component part, can also be connected to each other in a different way. For example, they can be glued together, welded, clipped on or connected to each other by another type of clamping connection.

The support element sections 114 of a support element 112 can also be arranged obliquely opposite each other. In this case, also the corresponding oppositely positioned upper and lower projections 58 and 60 or 74 and 62 are arranged obliquely opposite to each other.

The support element sections 114, instead of being arranged in pairs contiguously on a support element 112, can also be arranged separate from each other on separate support elements 112.

The carrier plates 110 can also be attached directly to the fold edges 98. In this case, the lateral strips 106 are obsolete.

The support plates 110, instead of being made of hard plastic material, can also be made of another, preferably hard, material.

Instead of the respective continuous carrier plates 110, two or more separate carrier plates 110 can be arranged also on the end face edge sides of the filter bellows 86. Each of the support elements 112 can then be arranged on its own carrier plate.

The support elements 112, instead of being arranged on the carrier plate 110, can also be attached to the respective lateral strip 106. The carrier plates 110 are then obsolete.

It is also possible to provide more or fewer than six support glue beads 102. The support glue beads 102, instead of being on the clean air side 46, can also be arranged on the raw air side 90. It is also possible to provide support glue beads on the clean air side 46 as well as on the raw air side 90. It may be possible to eliminate the support glue beads in certain circumstances.

While specific embodiments of the invention have been shown and described in detail to illustrate the inventive principles, it will be understood that the invention may be embodied otherwise without departing from such principles.

What is claimed is:

1. A flat filter element adapted to be mounted in a filter housing, the flat filter element comprising:
   an inflow surface;
   an outflow surface downstream of the inflow surface in a flow-through direction of the flat filter element;
   a filter medium extending between the inflow surface and the outflow surface;
   wherein the filter medium is a pleated filter medium folded in a zigzag shape into a course of zigzag shaped pleat folds forming a filter bellows, the pleated filter medium continuing from a first outer fold forming an upper end face of the filter bellows to a last outer fold forming a lower end face of the filter medium:
   a first set of pleat fold edges arranged at the inflow surface where fluid to be filtered entered the pleated filter medium;
   a second set of pleat fold edges arranged at the outflow surface where filtered fluid exits the pleated filter medium;
   a first side end face arranged on a zigzag filter medium edge which follows the course of zigzag shaped pleat folds forming the filter bellows, and arranged traverse to the pleat fold edges;
   an opposing second side end face arranged on an opposing zigzag filter medium edge of the course of zigzag shaped pleat folds forming the filter bellows, the second side end face spaced apart from the first side end face such that the pleat fold edges extend from the first side end face to the second side end face;

a circumferentially extending sealing section connected to the filter medium and circumferentially extending relative to the flow-through direction;

a seal fastened to or interacting with the sealing section, wherein the seal, when the flat filter element is mounted in a filter housing, separates an inlet of the filter housing for air to be purified from at least one outlet of the filter housing for purified air;

two flat rectangular lateral strips of an elastic, stretchable, flexible nonwoven fibrous web of material that is able to deform without breaking;
- a first one of the two flat rectangular lateral strips adhesively secured directly onto and completely covering the zigzag filter medium edge at the first side end face; and
- a second one of the two flat rectangular lateral strips adhesively secured directly onto and completely covering the zigzag filter medium edge at the second side end face, wherein the first and second lateral strips are separate, spaced apart on opposing ends of both the first and second pleat fold edges;

at least one first functional element section arranged on at least one circumferential side of the filter medium so as to be spaced apart from the circumferentially extending sealing section, wherein the at least one first functional element section is fixed directly onto to a respective one of the two flat rectangular lateral strips, wherein the at least one first functional element section is embodied as a support element section adapted to support the flat filter element on at least one inner side of the filter housing and is further embodied as a guide element section adapted to guide the flat filter element on the inner side of the filter housing during installation of the flat filter element in the filter housing;

wherein the at least one first functional element section is made of a plastic material that is able to elastically deform without breaking, such that upon insertion of the flat filter element into a filter housing, the first functional element section elastically yields so that the flat filter element can also pass constrictions and/or projections within the filter housing.

2. The flat filter element according to claim 1, wherein the at least one first functional element section is elastically movable and/or deformable relative to the filter medium at least transverse to an installation direction of the flat filter element into the filter housing.

3. The flat filter element according to claim 1, further comprising
- a first carrier plate abutting against and resting directly and affixed onto the first one of the two flat rectangular lateral strips;
- a second carrier plate abutting against and resting directly and affixed onto the second one of the two flat rectangular lateral strips;
- wherein the at least one first functional element section is attached to a respective one of the carrier plates.

4. The flat filter element according to claim 3, wherein the carrier plates are comprised of a plastic material.

5. The flat filter element according to claim 3, wherein the carrier plates cover only a partial section of the respective one of the rectangular lateral strips.

6. The flat filter element according to claim 3, wherein the carrier plates are is attached by an adhesive material to the respective one of the rectangular lateral strips.

7. The flat filter element according to claim 3, wherein the at least one first functional element section and the respective carrier plate is a two-component injection molded part.

8. The flat filter element according to claim 1, comprising at least one second functional element section that is spaced apart in a direction traverse to the flow-through direction from the at least one first functional element section.

9. The flat filter element according to claim 8, further comprising
- a first carrier plate abutting against and resting directly and affixed onto the first one of the two flat rectangular lateral strips;
- a second carrier plate abutting against and resting directly and affixed onto the second one of the two flat rectangular lateral strips;
- wherein the at least one first functional element section and the at least one second functional element section are attached to the carrier element.

10. The flat filter element according to claim 8, wherein the at least one first functional element section and the at least one second functional element section are supported in opposite directions traverse to the flow-through direction on appropriate support or guide areas on inner sides of the filter housing.

11. The flat filter element according to claim 8, wherein between the at least one second functional element section and the at least one first functional element section a support gap interrupting a support action in a circumferential direction of the flat filter element is provided.

12. The flat filter element according to claim 1, wherein the circumferentially extending sealing section is arranged in the area of the inflow surface, wherein the at least one first functional element section is arranged in the area of the outflow section.

13. The flat filter element according to claim 1, wherein the circumferentially extending sealing section is arranged in the area of the outflow surface, wherein the at least one first functional element section is arranged in the area of the inflow section.

14. The flat filter element according to claim 1, wherein the lateral strips form a section of the circumferentially extending sealing section on the first or second side edge face.

15. An air filter comprising:
a filter housing having
- at least one inlet for air to be purified;
- at least one outlet for purified air;
- an interior;

a flat filter element according to claim 1;
- wherein the seal, when the flat filter element is mounted in the filter housing, separates the at least one inlet of the filter housing for air to be purified from at least one outlet of the filter housing for purified air;
- wherein the flat filter element is arranged in the interior of the filter housing such that the flat filter element separates the at least one inlet from the at least one outlet;
- wherein the at least one first functional element section is embodied as a support element section elongated in a direction traverse to the flow-through direction and contacting the interior of the filter housing, supporting the flat filter element on at least one inner side of the filter housing and is further embodied as a guide element section adapted to guide the flat filter element on the inner side of the filter housing during installation of the flat filter element in the filter housing;

wherein the at least one first functional element section is made of a plastic material that is able to elastically deform without breaking, such that upon insertion of the flat filter element into the filter housing, the first functional element section elastically yields.

* * * * *